US008581961B2

(12) United States Patent
Lee

(10) Patent No.: US 8,581,961 B2
(45) Date of Patent: Nov. 12, 2013

(54) STEREOSCOPIC PANORAMIC VIDEO CAPTURE SYSTEM USING SURFACE IDENTIFICATION AND DISTANCE REGISTRATION TECHNIQUE

(75) Inventor: Kenneth Kun Lee, Fairfax, VA (US)

(73) Assignee: VanGogh Imaging, Inc., McLean, VA (US)

( * ) Notice: Subject to any disclaimer, the term of this patent is extended or adjusted under 35 U.S.C. 154(b) by 460 days.

(21) Appl. No.: 13/065,875

(22) Filed: Mar. 31, 2011

(65) Prior Publication Data

US 2012/0249730 A1 Oct. 4, 2012

(51) Int. Cl.
*H04N 13/02* (2006.01)
*G06K 9/36* (2006.01)

(52) U.S. Cl.
USPC ............................................. 348/38; 382/154

(58) Field of Classification Search
USPC ............................................................ 348/38
See application file for complete search history.

(56) References Cited

U.S. PATENT DOCUMENTS 7,982,777 B2 * 7/2011 Prechtl et al. ............ 348/211.11
2008/0298674 A1 * 12/2008 Baker et al. ................... 382/154

* cited by examiner

*Primary Examiner* — Sath V Perungavoor
*Assistant Examiner* — Howard D Brown, Jr.

(57) ABSTRACT

A method of interpolating images from original images are disclosed. Interpolation of images is based on the captured images, normal vector of the image segment plane and distance between the camera and the original image. Image segment groups retrieved are selected in order to discard and select only the image segment groups that meet criteria. Further processing of applying a shape change, merging the interpolated images and smoothing of the merged images provide interpolated images for viewing at angle of a virtual camera.

20 Claims, 10 Drawing Sheets

Image divided into Image Segments a) original   b) interpolating   c) merging   d) smoothing Tilt Factor Rotate Left  Rotate Right a) Looking up b) Looking level c) Looking down

STEREOSCOPIC PANORAMIC VIDEO CAPTURE SYSTEM USING SURFACE IDENTIFICATION AND DISTANCE REGISTRATION TECHNIQUE

FIELD OF THE INVENTION

The present application relates to a method of generating interpolated images based on a virtual angle.

BACKGROUND OF THE INVENTION 3D stereo camera has two lenses. Pictures taken through the two lenses are similar but different as they are taken from two slightly different angles (like how the human eyes capture the stereo images). The idea of the panoramic stereo view is to be able to capture not just one viewing angle but an entire 360 degree view of the scene in 3D. Taking this idea one step further, one can capture the spherical panoramic video which also captures the top and the bottom viewing angles of the scene also in 3D. In this application, spherical and panoramic viewing is interchangeable since capturing the spherical view is just an extension of the panoramic view and same principles apply.

One way to record the panoramic view in 3D is to take multiple stereo cameras and simultaneously record the panoramic scene. Enough stereo cameras are needed to capture the entire scenery. Unfortunately, because there are two eyes, there are an infinite number of viewing angles from two views as those two eyes rotate around to view the surrounding.

Referring to FIG. 4, human eyes will see a stereo pair of images A1, A2 and overlapped section from position A. From position B, human eyes will see a stereo pair of images B1, B2 and overlapped section. Obviously, it would be impossible to have infinite number of cameras positioned around the circle.

One approach used to address this problem is to capture the surrounding images using a finite number of cameras, and take those images to make a stitched panorama image. Using these pair of panoramic images, interpolate the images for the in-between viewing angles. With enough number of cameras, this can approximate the stereo panoramic view. However, this simple approach creates a significant parallax error which is caused by using images that are approximate but not an exact image from that particular angle especially for objects that are closer to the cameras. Parallax error is well documented and known problem in panoramic stitching.

In order to minimize this parallax problem, a complex optical system using convex or concave lenses with or without mirrors can be used to capture more image information from different viewing. The problem, however, is that such a system can be very difficult and costly to implement or at the least results in lower resolution images. In addition, reconstructing the stereo pair for each viewing angle becomes a very difficult problem since any optical flaws in the lenses and mirrors are amplified.

Another method would be to take a 3D scan of the surrounding scene capturing not just the RGB information of the scene but the position (X, Y, and Z coordinate) of every pixel and the RGB's viewing angle of each pixel respect to the scanner. FIG. 5 shows a pixel that has the following information—RGB (color), pixel position (X, Y, Z), scanner position (Xs1, Ys1, & Zs1). There are already a number of well known ways to capture the 3D scan and therefore will not described here. Using multiple 3D scanners, multiple 3D scans can be simultaneously taken from enough viewing angles to pick up as much pixel information from the surrounding area. If enough pixel information is captured, the surrounding scene can be easily reconstructed using the position and RGB information. Unfortunately, this requires very expensive 3D scanners and significant post-processing which may work for static images but not for dynamic images. Just as importantly, reconstruction of this method results in a grainy image since it is constructed pixel to pixel and the resulting image does not have the high resolution smooth look.

In this invention, a new approach is presented of interpolating the scenes from new viewing angles using the depth information from the 3D scanning technique but using that information only to change the captured 2D high resolution images that will best approximate the image from the new viewing angle. Using stereometric triangulation technique, the depth information can also be derived from the pair of 2D high resolution images taken from two different positions without the need for a separate 3d scanner. While the stereometric solution results in less than perfect scan, this new method of interpolating is much more tolerant to any scanning errors. Therefore, this new interpolating method has a distinct advantage of being able to use a low-cost depth extraction technique while still being able to provide the highest image resolution and with minimal processing requirement. The tradeoff of this new method versus pixel-pixel 3D mapping is that there may be some distortions in the interpolated images since we are not doing exact pixel mapping of the scene to the depth information but such distortions should be kept minimal in most cases and tolerable to the human brain.

SUMMARY OF THE INVENTION

The present invention provides a method of providing interpolated images to an electronic device based on a virtual angle, the method comprising the steps of: capturing at least one original image from each of a plurality of cameras in a camera rig; dividing the image into a plurality of image segments; grouping the image segments to provide a plurality of image segment groups (ISGs) based on distance information and normal vector information of the image segments, wherein the normal vector information is a vector perpendicular to a best fitting plane of an image segment; storing the plurality of ISGs into a memory device, wherein each of the ISGs is stored with camera information, timestamp, the distance information and the normal vector information; retrieving a first ISG from the memory device, wherein the first ISG is retrieved from the memory device based on the virtual angle; projecting the first ISG into three-dimensional space; selecting and discarding sections of the first ISG to provide a selected ISG, wherein the selected ISG is selected based on the position of the virtual angle in relation to neighboring cameras; interpolating by applying an amount of shape change to the selected ISG to provide an interpolated ISG, wherein said amount of shape change is determined by a reverse process of projecting an original ISG; repeating the steps of retrieving, projecting, selecting and interpolating until all ISGs relevant to the virtual angle have been processed;

merging the interpolated ISGs to provide a merged ISG; applying smoothing to the merged ISG to provide an output signal; and transmitting the output signal to the electronic device.

According to an aspect of the present invention discloses a method of providing interpolated images to an electronic device based on a virtual angle, the method comprising the steps of: retrieving a first image segment group (ISG) from a plurality of ISGs stored at a memory device based on the virtual angle, and wherein the plurality of ISGs are formed by dividing and grouping images captured by plurality of cameras in a camera rig; projecting the first ISG into three-dimensional space; and interpolating by applying an amount of shape change to the first ISG to provide an interpolated ISG, wherein said amount of shape change is determined by a reversed process of projecting an original ISG.

The present invention also discloses wherein said projecting the first ISG into three-dimensional space is based on a distance between a focal point and the first ISG (z), distance between one of the four corners of the first ISG and one of the four corners of a projected image(d), normal vector (v), coordinates of a focal point $f(x_f, y_f, z_f)$, coordinates of the first ISG (x', y', z'), and coordinates of a projected image (x, y, z).

The final output in generating interpolated images are transmitted as Intimage$\theta_h \theta_v$(t), wherein Intimage is an interpolated image, t is timestamp, $\theta_h$ is horizontal viewing angle of virtual camera, and $\theta_v$ is vertical viewing angle of virtual camera, and each of the viewing angles are between 0 and 360 degrees.

DETAILED DESCRIPTION

Figure 10:
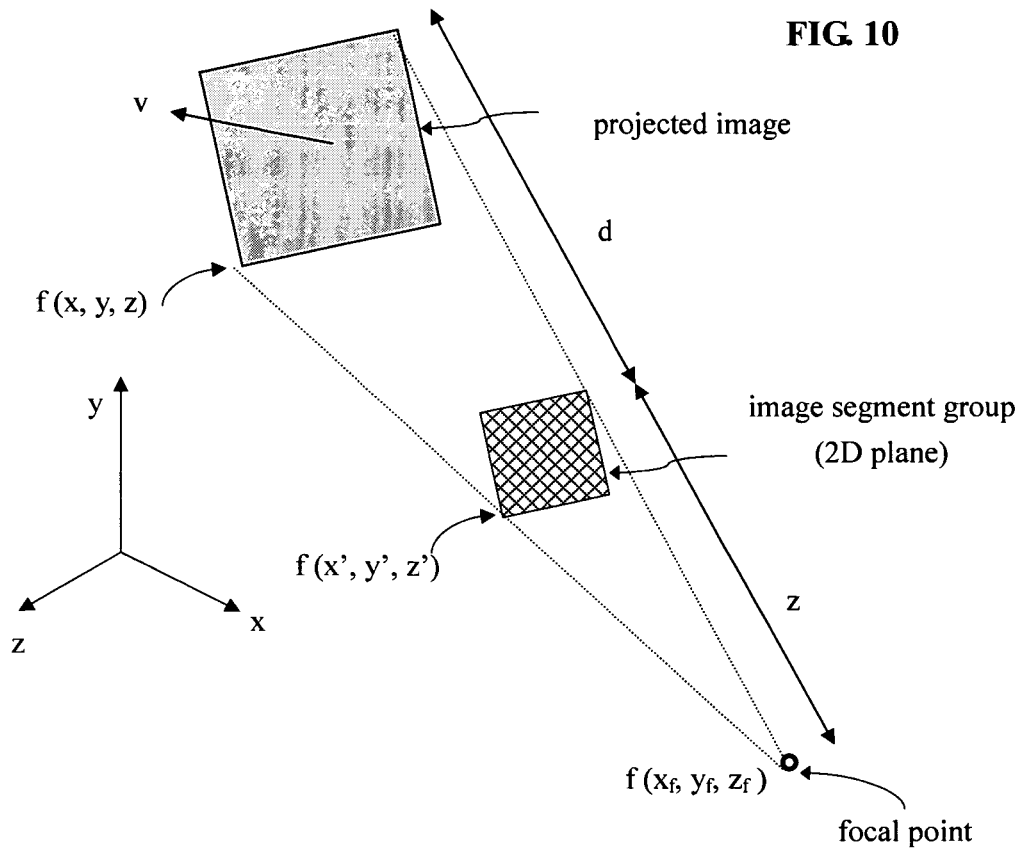
FIG. 10 illustrates how an image segment is projected back into three-dimensional (3D) space based on the distance and normal vector of the image segment to best approximate the location of the original scene in the real world.

The concept behind the present invention is as below. When one views through a camera lens, one sees an image, which is illustrated in FIG. 10. Note three parts in the diagram: the focal point, the image segment group and the projected image. The focal point is the eye of a user viewing through the camera, or is the focal point of the camera. The image segment group represents the LCD display of 2D plane viewable by the user of the image captured by the camera (or CCD 2D plane). The projected image represents the actual image, which is in three-dimension as the real world is in three dimensions.

Figure 12:
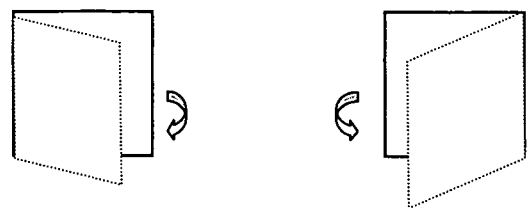
FIG. 12 illustrates how the shape of the scene in the image changes as the perspective changes
Figure 12:
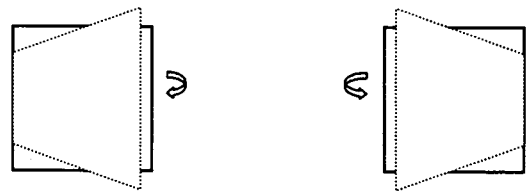
Figure 12:
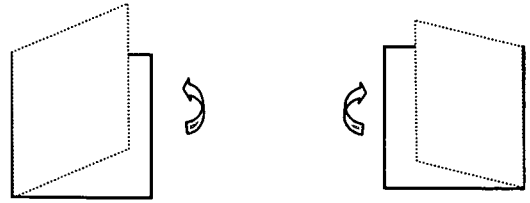

When one rotates left or right, and/or looks up, down or at a level while maintaining the angle and distance with the camera, the image being displayed on the LCD display correspondingly changes. One may easily verify this by cutting out a rectangular-shaped hole on a piece of paper, which represents the LCD display of a camera. Viewing through the hole on the paper, the following can be observed. In FIG. 12, a viewer rotating left sees an original image of a rectangle tilted as shown in dotted lines. Different tilt factor results when rotating right. Furthermore, the tilt factor is also varied depending on the viewing angle of: looking up, looking at the same level, and looking down to an image. Therefore, one can recognize that the shape of the object viewed on the LCD display varies depending on the viewing angle. This is known in image processing as perspective.

This principle is extended to the present invention of recognizing shape change of an original image based on the viewing angle. Since the shape of the object viewed from a direct view is known, one can estimate and calculate a shape change (tilt factor) based on a desired viewing angle and adjust the 2D image with accordingly to best provide the new perspective. The present embodiment of the invention initially captures data of the object or scenery of interest, as will be described in relation to FIG. 1 and provides interpolated images or scenery based on a virtual angle (otherwise known as the viewing angle where a camera does not exist to provide the exact image from that viewing angle).

Figure 1:
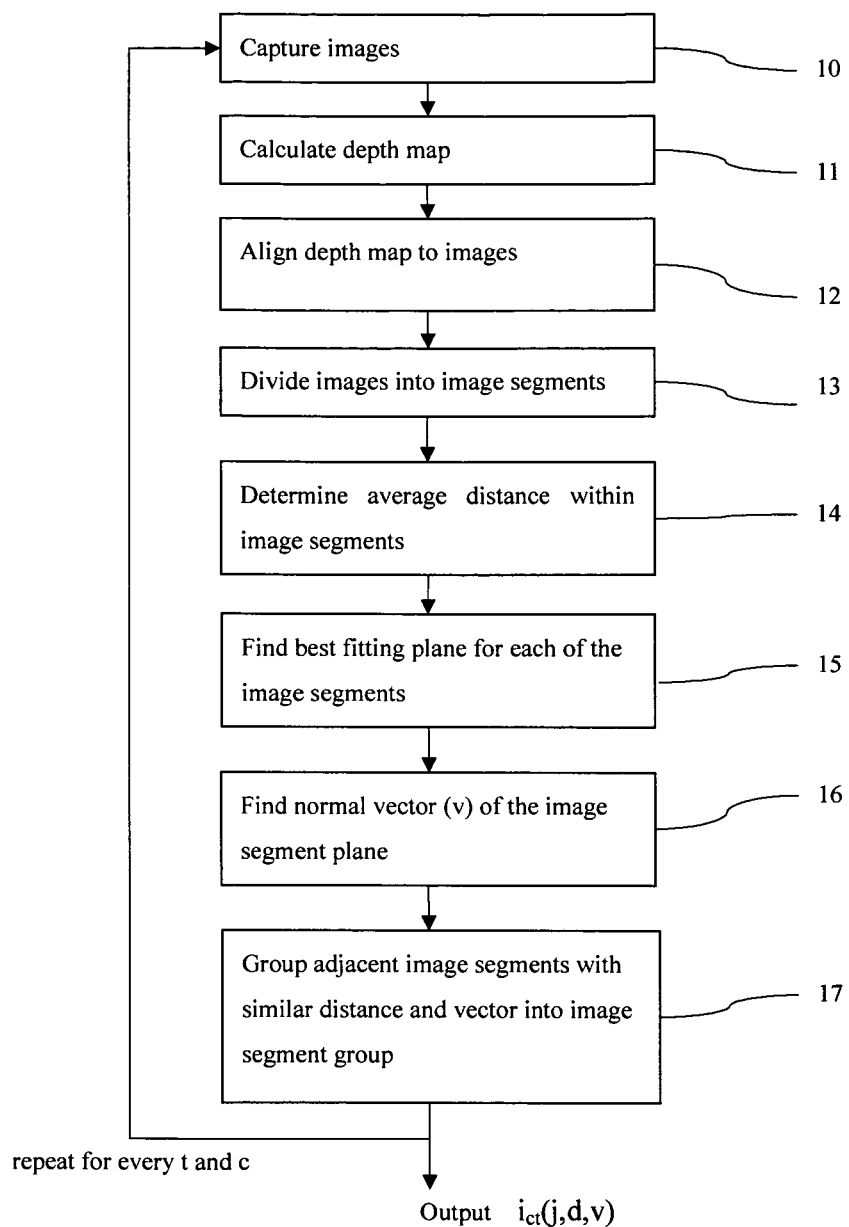
FIG. 1 is a flowchart of capturing data from plurality of cameras.
Figure 3:
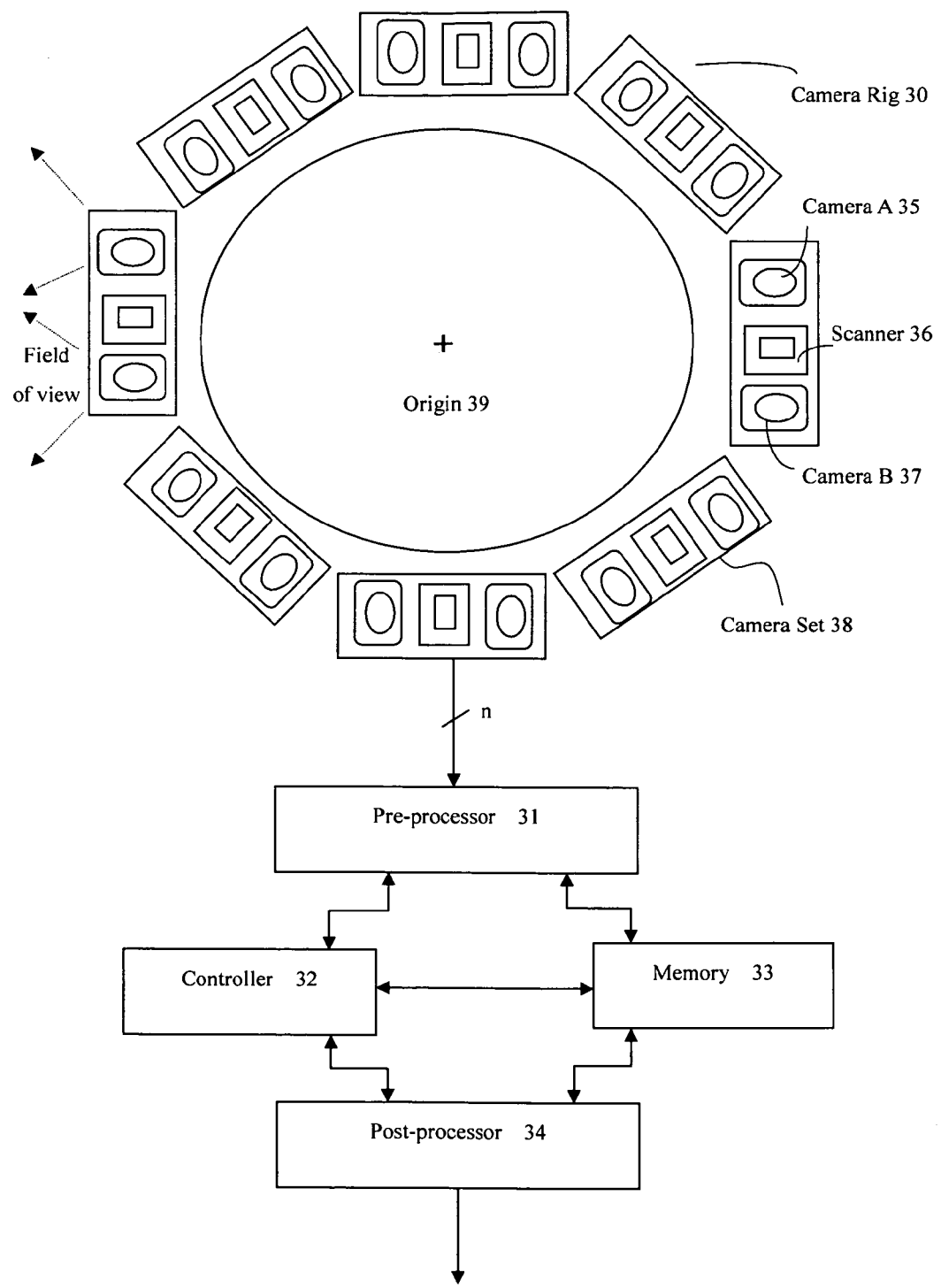
FIG. 3 is a hardware diagram of a present embodiment.
Figure 4:
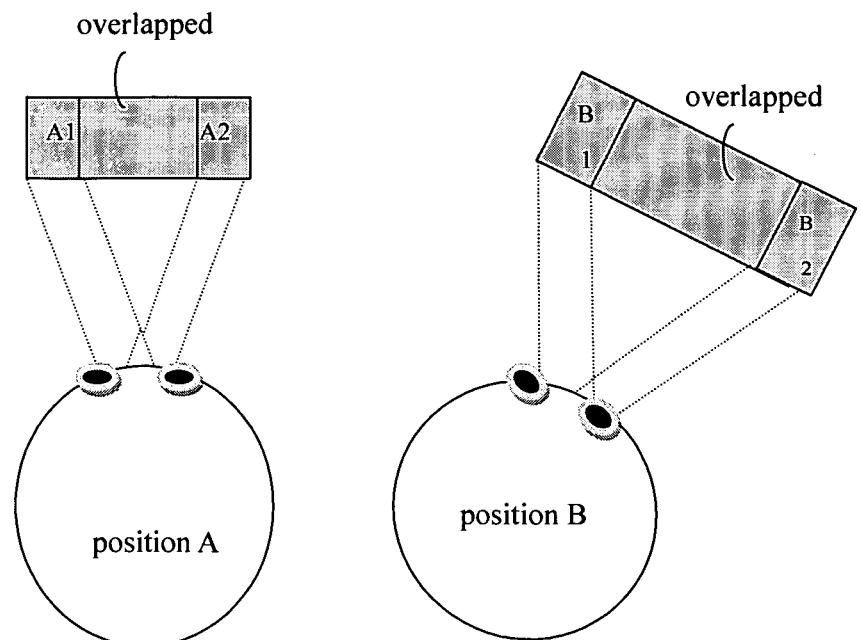
FIG. 4 is stereoscopic images captured by a pair of cameras or human eyes in different angles, which is well-known in the art.
Figure 5:
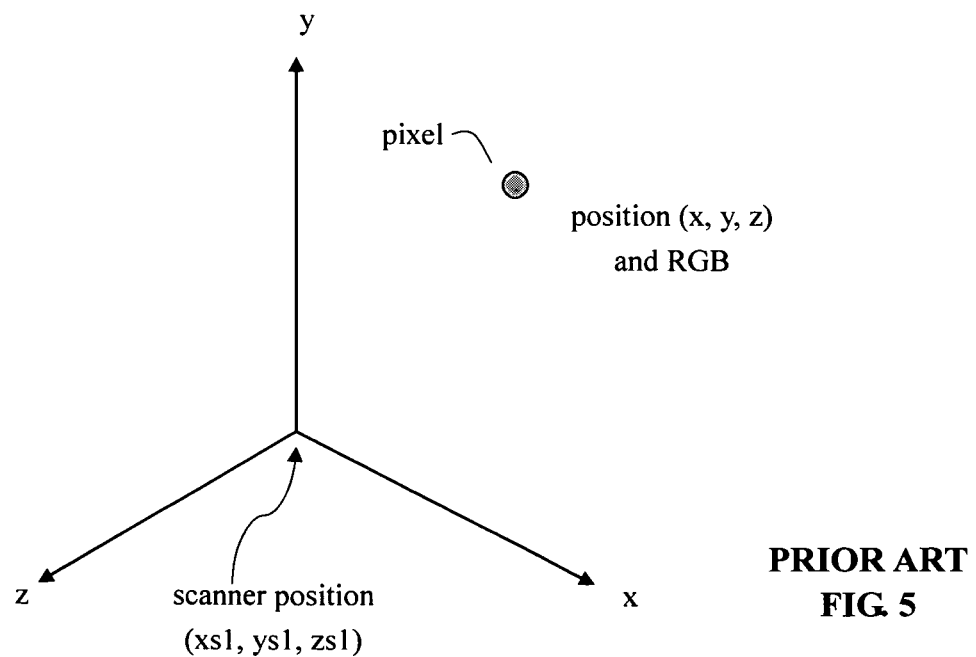
FIG. 5 illustrates a well-known method of capturing information of pixel position, RGB of the pixel and position of 3D scanner.

Referring to FIG. 1, for every timestamp of t=1 to t=N, each of the M cameras (wherein M is the number of cameras) provides its respective images and are captured in step 10. The cameras are configured in a preconfigured arrangement, such as illustrated in FIG. 3. Since the cameras are positioned at their corresponding locations with a specific distance away from the origin 39 (indicated by +) in FIG. 3, the images provided by each camera is unique to each camera but could be combined in the future since what is known in the industry as the registration technique can be used to find the poise and angle of all cameras thereby allowing us to be able to combine these image into a single scene.

The camera rig 30 includes a set of cameras of camera A 35, camera B 37, and scanner 36, wherein the set of cameras may optionally only include camera A and camera B without the scanner. The set of cameras are to represent the left and right side of human eyes. The camera rig includes multiple set of stereo cameras with viewing angles wide enough to cover the entire 360 degree scene. Each of the cameras has its respective field of view. The number of cameras may be increased or decreased depending on different applications. Each of the cameras in FIG. 3 provides its images to the Pre-processor 31 that are captured for every timestamp wherein there are plurality of timestamps per second. The images are also tagged with the information on which camera was used in capturing.

The camera set 38 includes two cameras and one scanner, but is not limited to that setting. Camera set 38 may include two cameras only without a scanner, or may include a single camera and a scanner. For the first configuration of the camera set including two cameras and one scanner, camera on the left captures left eye images and camera on the right captures right eye image. Each image is time-stamped so that stereo image pairs (image taken at the exact time from both cameras)

constitute the stereo pair for that time stamp. 3D scanner separately captures the depth information of the scan for each of the pixels captured for both cameras. All images captured by the left eye cameras are used by the interpolated algorithm to create a scene for the virtual camera. Similarly, the right eye images are interpolated using the images captured by the right eye cameras. All images used by the interpolated algorithm will have the same time stamp.

For the configuration of two cameras only in the camera set 38, the two cameras use stereometric method to capture the depth information for the pixels captured by both left and right eye cameras. And as described above, the left and right cameras capture the left and right eye images.

In the case of having a single camera and a scanner, the single camera is used to capture the image and the depth camera is used to get the distance to every pixel on the 2D image. From this information, images are interpolated to provide right eye image. The right eye images are interpolated from images obtained from the left eye cameras.

In step 11, the captured images are processed to determine the distance from the camera to the location of the image which is indicated by d in FIG. 10. There are several methods to determine this distance. Each of the camera pairs could include a 3D scanner that provides the distance information, and another method could be to use stereoscopic method, a well-known method and is not discussed further herein.

The distance information determined in step 11 is aligned with the 2D image captured in step 10. When using 3D scanner to provide the distance information, this is not the same camera that is used to acquire the high-definition (HD) image in step 10. And when the stereoscopic method is used, the depth map or distance information generated may not align exactly to the 2D image captured by the HD camera. Since the depth map and the High Def images are captured by separate cameras, the depth map must be aligned to the 2D image. This mapping process is once again known as registration technique which as mentioned, is well known concept in the 3D industry.

Basically, once the position/location and angle of the 3D scanner and the HD cameras are known, the distance information is mapped pixel by pixel to the high definition images in step 12 based on each respect camera and scanner's position, angle, and poise.

Figure 2A:
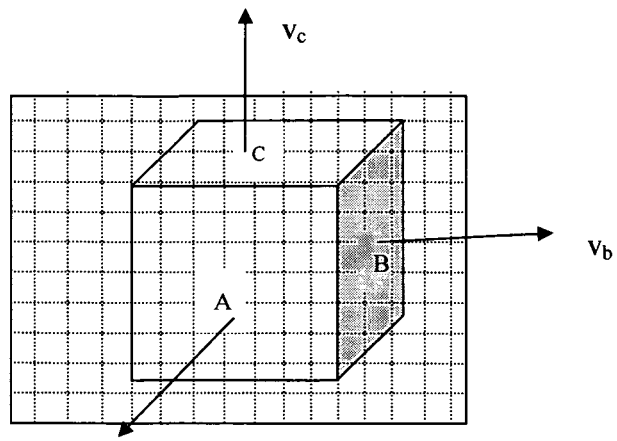
FIG. 2A is an example an image of a cube divided into image segments.

In step 13, each of the images is then divided into small segments. FIG. 2 shows an image having a cube captured by a camera that is divided into equally-sized image segments. The size of the image segment may be programmable through software by a user wherein the segment would have an appropriate size to differentiate one element from another in an image. For example of a cube with three planes, one image segment would only include one plane of the cube, and not more than one plane. If an image segment includes more than one plane of the cube, then the size of the image segment should be reduced to a smaller size in order to reduce any potential distortions in interpolation process. However, since smaller image segment may mean a need for more processing and storage, it is up to the user may decide to go with a large image segment size. Note also that the image segment do not have to be a square but also other shapes that represents a surface such as triangle or any quadrilateral.

Returning to FIG. 1, the distance information for each of the image segments is averaged in step 14. The distance information from step 11 may include distance information per pixel. However, processing image based on a pixel-level requires faster processor for calculating more data, and bigger memory size for data storage, and consumes more processing time. In order to reduce this data, the distance information of each of the image segments, which includes distance information of the pixels within the image segments, is averaged. The distance information may be smoothed before averaging by throwing out pixels that are very far removed from most pixels in that image segment in order to eliminate any outliers that may distort the approximate distance to the image segment.

At the next step, best fitting plane is determined for each of the image segments in step 15. Prior to determining the normal vector, a plane that best fits to the image segment is determined. The image within the image segment may be flat, curved or warped. This step selects a plane that most closely resembles to the actual image within the image segment. And based on this, the normal vector (v) of the image segment plane is determined, step 16, which is a vector perpendicular to the selected plane. The advantage of determining the normal vector will be described later. This basically indicates which direction the object in the scene in the image segment is "facing" for example either toward the camera or away from the camera in the real-life 3D space.

In step 17, image segment groups are formed by grouping the image segments that are connected to each other in the 2D image with similar distance (d) and normal vector (v). It may not be necessary to perform separate computations when similar image segments in terms of its distance and vectors can be grouped. The system may reduce overall load of data computation by grouping them into image segment groups. Hence, the size of the image segment groups may be maximized in order to reduce data computations.

The flowchart in FIG. 1 then provides output in a form of $i_{ct}(j,d,v)$ wherein i represents image segment group, c is camera, t is timestamp, j is position of the image segment within the image, d is distance information, and v is the normal vector of the image segment plane. The flowchart is also repeated for every timestamp (t) and for every camera.

The output of FIG. 1 may be stored in memory 33, such as a hard drive, DRAM, or any other type of storage media. The flowchart described above is mainly controlled by controller 32 operating along with Pre-processor 31 and memory 33 in order to capture all the information and images to provide the output in the form of $i_{ct}(j,d,v)$. The controller and the pre-processor may be optionally performed by a single processor or by software controlled by a microprocessor, controller or CPU executing the steps of FIG. 1. The flowchart in FIG. 1 is repeated for each camera installed in the camera rig. In order to provide a user with 3D images, for example, images from camera A 35 and camera B 37 in FIG. 3 provide images for the left and right eyes of the user.

Referring back to FIG. 2A, the captured image of the cube has been determined, in step 15 of FIG. 1, of having three planes wherein the best fitting planes are planes A, B, and C. The normal vector (v) of the image segment plane is determined in step 16, which is a vector perpendicular to the selected plane. Thus, the normal vector (v) of plane A points in the direction of $v_a$, v of plane B point in the direction of $v_b$, while v of plane C points in the direction of $v_c$.

The advantage of determining the normal vector (v) of the image segment plane is as below. In this example of an image with a cube, see FIG. 8, cameral captures sides A, B, and C of the cube. When the normal vector is not taken into consideration, interpolated image created at the new viewing angle by applying shape change to the image captured by cameral would include all of the sides A, B and C. However, side B should not be visible from the angle of the virtual camera, thus the interpolated image from the new viewing angle showing side B would not be accurate. Taking normal vector into consideration, on the other hand, normal vector $v_b$ faces away from the new viewing angle. Therefore, the correct interpolated image includes only sides A and C, as shown. In the case of the sides A and C, v also helps in calculating the right amount of the change to those images to form the interpolated image. As an example, since the normal vector of C is known and it is facing straight up, it is easy to find the correct perspective of that part of the image around C.

As previously mentioned, the number of cameras or set of cameras in a camera rig is configurable based on its needs. In this example, there are eight cameras numbered from one to eight in FIG. 7 that have been pre-calibrated and registered to each other, such that distance from an origin to a camera, and distance from one camera to another camera, including all of the cameras in the camera rig is known. From the x-y plane in FIG. 7, the cameras are at equal distance away from the origin (or, center of the camera rig). Cameras in their respective location may be a single camera or may be a pair of cameras. Each of the cameras captures respective images that are provided to the Pre-processor 31 in FIG. 3 and the output of flowchart in FIG. 1 provides the captured images in the form of $i_{ct}(j,d,v)$.

Figure 2B:
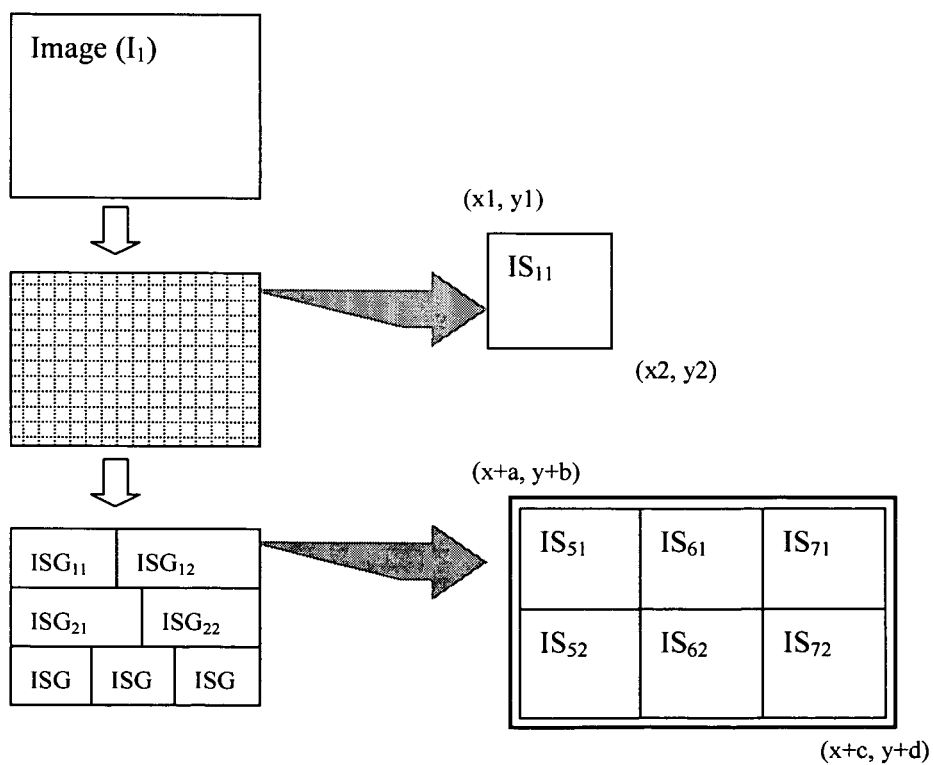
FIG. 2B illustrates an image captured by a camera that is divided into image segments and grouped into image segment groups based on distance and normal vector.

FIG. 2B illustrates how the image segment groups are formed from an original image captured by a camera. Initially, an image ($I_1$) is captured. Next, the image is divided into image segments, which is performed in step 13 of FIG. 1. An example of one of the image segment is further shown wherein the coordinates of $IS_{11}$ within the image ($I_1$) is from (x1, y1) to (x2, y2). As previously described, the image has been divided into image segments, thus one captured image includes plurality of image segments. $IS_{11}$ has been illustrated as one of the image segment within the image ($I_1$). After determining the distance and normal vector for each of the image segments, image segment groups (ISG) are formed by grouping adjacent image segments with similar distance (d) and normal vector (v), performed at step 17 in FIG. 1. As shown at the bottom of FIG. 2B, $ISG_{12}$ includes several image segments (IS) of $IS_{51}$ $IS_{61}$, $IS_{71}$, $IS_{52}$, $IS_{62}$ and $IS_{72}$. The position information (j) of the $ISG_{12}$ within the image is from (x+a, y+b) to (x+c, y+d). These image segments were grouped into one ISG since the distance (d) and vector (v) are similar. Now, the image ($I_1$) includes a plurality of ISGs wherein each of the ISGs are stored into the memory along with their respective position information (j), distance information (d), and normal vector information (v).

Figure 7:
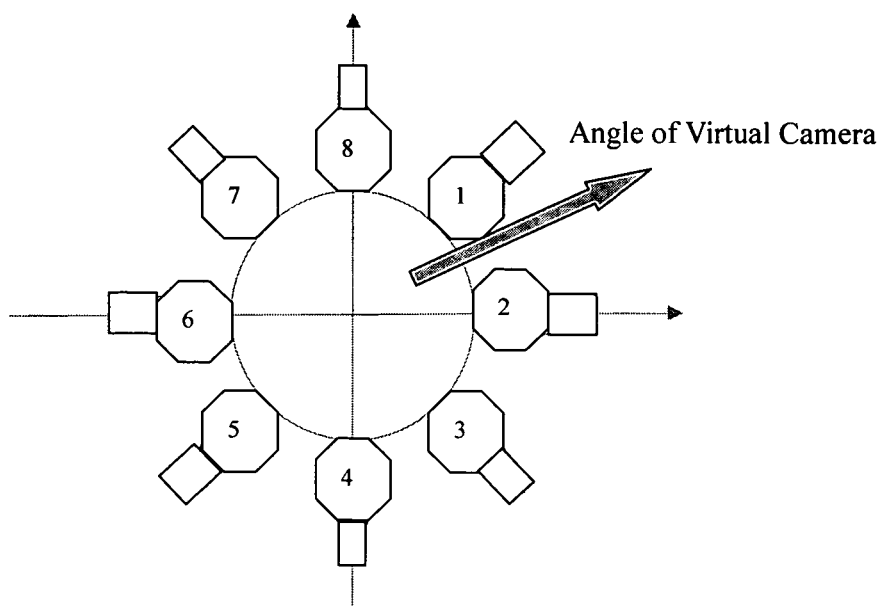
FIG. 7 is a hardware diagram of a camera rig having a set of cameras, and an angle of virtual camera positioned between two cameras.

Once the data of the images or scenery have been captured, the present embodiment is ready to provide interpolated images based on a virtual angle. A process to generate interpolated images may be triggered when a new viewing angle is requested, as shown in FIG. 7. The camera rig is not configured with a camera to provide a direct view from the new viewing angle. Instead of moving the camera or installing a new camera at the new viewing angle, the present invention allows the system to deliver interpolated images as if a camera is capturing images directly from the new viewing angle. In order to deliver these images, the system performs the following steps.

The steps are performed for timestamp t=1 to N, wherein N is an integer greater than one. Previously in FIG. 1, each of the images was divided into image segment groups. In step 62, these image segment groups are retrieved from the memory 33. Determination of image segment groups to be retrieved from memory is based on whether the image segment groups can be seen from the virtual angle. Hence, only relevant image segment groups are retrieved. On the other hand, if the system is in a spherical viewing mode (such as a theater where the screen wraps around a viewer, for example at a planetarium), then all the image segment groups are retrieved, since the virtual angle covers all 360 degrees.

The two-dimensional image segment groups retrieved from the memory are projected into 3D space, as shown in FIG. 10 to find the original position of the captured scene in the 3D space. In order to project the image segment groups into 3D space, the following are taken into consideration: distance between the focal point and the image segment group (z), distance between one of the four corners of the image segment group and one of the four corners of the projected image(d), normal vector (v), coordinates of a focal point f ($x_f$, $y_f$, $z_f$), coordinates of image segment group (x', y', z'), and coordinates of the projected image (x, y, z). Further description regarding projecting into 3D space will be provided later.

Figure 9:
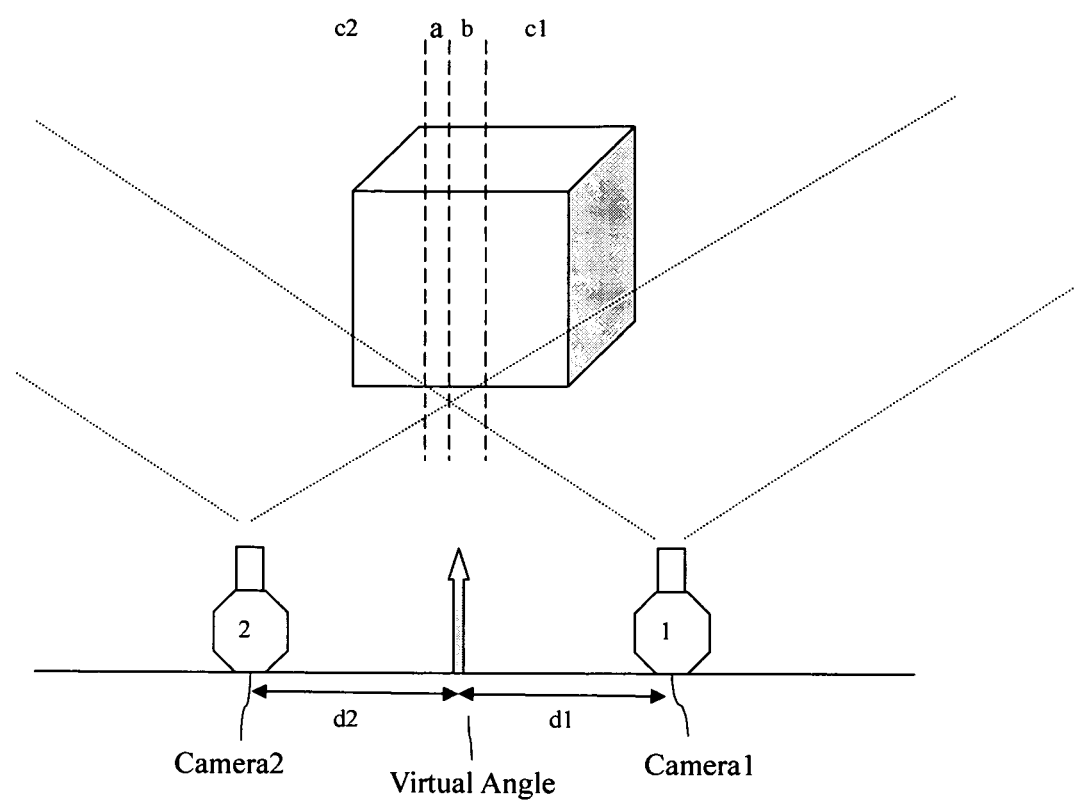
FIG. 9 is diagram of sectioning and selecting image segments from two neighboring cameras based on the position of the virtual camera in relation to its neighboring cameras.

In the example shown in FIG. 9 is one or more image segment groups of a cube projected into 3D space, wherein the same image of the cube was captured by both camera 1 and camera 2. Section a and section b of the image, or overlapped sections, were captured by both camera 1 and camera 2. It is not necessary to interpolate all of the images captured by both cameras. In order to provide interpolated image from the location or position of the virtual camera, image sections of section a and section c2 from camera2 is selected, while the image sections of section b and section c1 from camera1 is selected. In other words, although camera1 captured section a and part of section c2, these image segments are discarded. Also, section b and section c1 captured by camera2 are discarded. Only selected image sections from corresponding cameras are processed in providing interpolated images. Thus, the selection of the image sections is dictated by the location or position of the virtual camera in relation to the neighboring cameras.

For example, if the position of the virtual camera is exactly the same as camera1, then image(i)=image(1), wherein image (i) is the image viewed by the virtual camera and image(1) is the image captured by camera1. If the position of the virtual camera is equal to camera2, then image(i)=image(2), wherein image(2) is the image captured by camera2. In these cases, selecting and discarding section f the image may be skipped. And if the position of the virtual camera is somewhere between camera1 and camera2, the interpolated image or the image viewed at the angle of the virtual camera is captured by:

Image(i)=(d1/(d2+d1))(image2)+(d2/(d2+d1))(image1), wherein d1 is the distance between the virtual camera and camera1, d2 is the distance between the virtual camera and camera2, image1 is the image captured by camera1, and image2 is the image captured by camera2.

Figure 6:
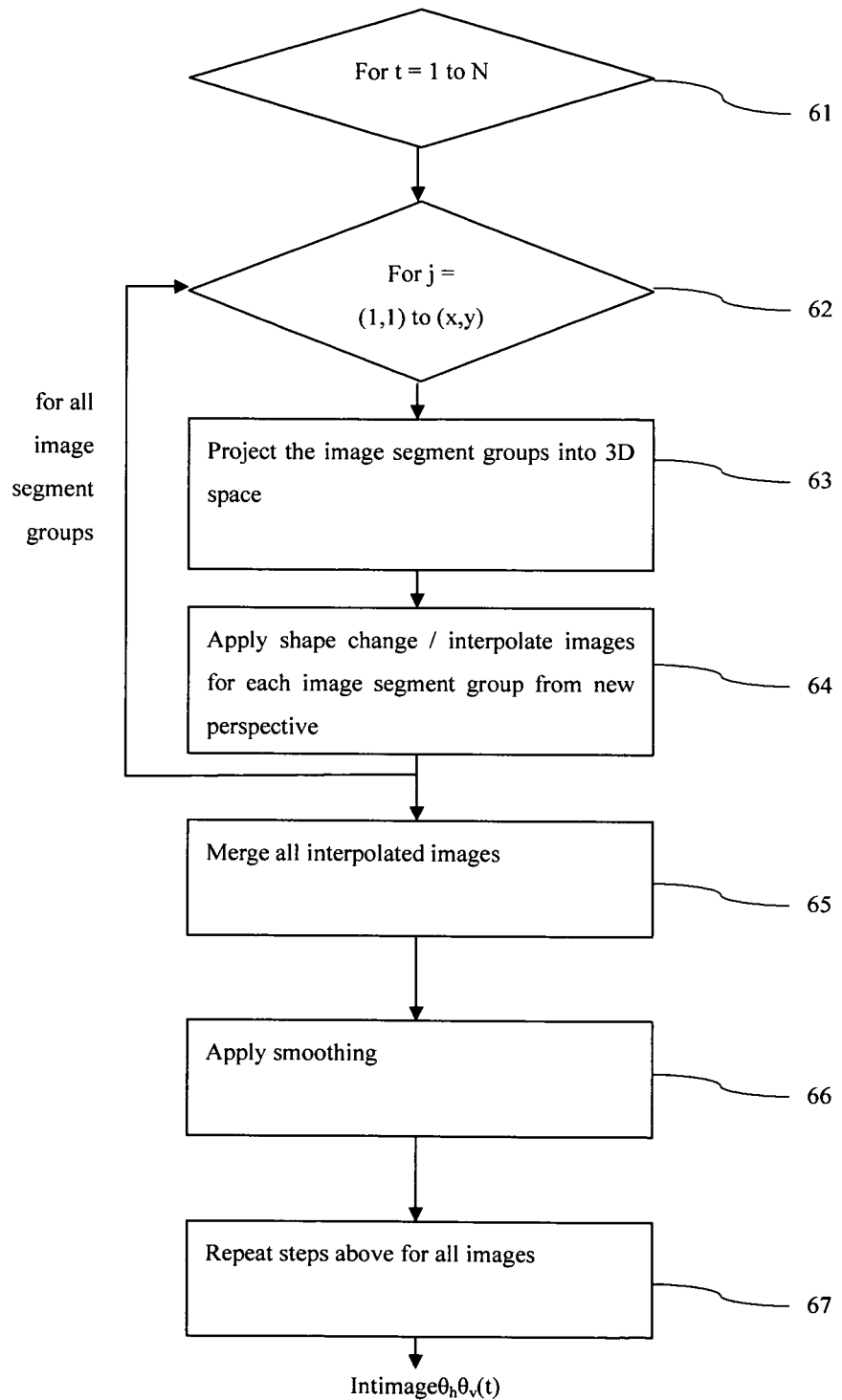
FIG. 6 is a flowchart of how to make changes to the original image to provide an interpolated image from a different perspective.

Returning to FIG. 6, since all image segment groups within the viewing angle of the virtual camera have been processed in step 63, the next step of shape change is applied in step 64. As shown in FIG. 10, f($x_f$, $y_f$, $z_f$) is the coordinate of a focal point in a three-dimensional (3D) space. The image segment groups selected (two-dimensional) in step 63 of FIG. 6 is also projected into the same 3D space.

One would recognize that separate computations are performed for each corners of the projected image based on corresponding corners of the image segment group. The distance (d) and the normal vector (v) of the image segment group from camera1 or camera2 are used for computation of the projected image. The main purpose of this invention is to efficiently and quickly produce a projected image, and not to produce an image with accurate measurements. Hence, the coordinates of each corners of the projected image are calculated by the following:

$$C = B + \frac{((B-f)*d)}{z}$$

wherein f is the coordinates of the focal point, B is the coordinates of one of the corners of the image segment group, C is the coordinates of one of the corners of the projected image, d is the distance between B and C, and z is the distance between f and B.

For the bottom left corner, is as follows:

$$(x, y, z) = \frac{((x', y', z')*d)}{\sqrt{(x'-xf)^2 + (y'-yf)^2 + (z'-zf)^2}}$$

After calculating coordinates for all four corners of the projected image by using the same formula above, normal vector (v) is applied to properly align the face of the image segment group in the 3D space.

Figure 8:
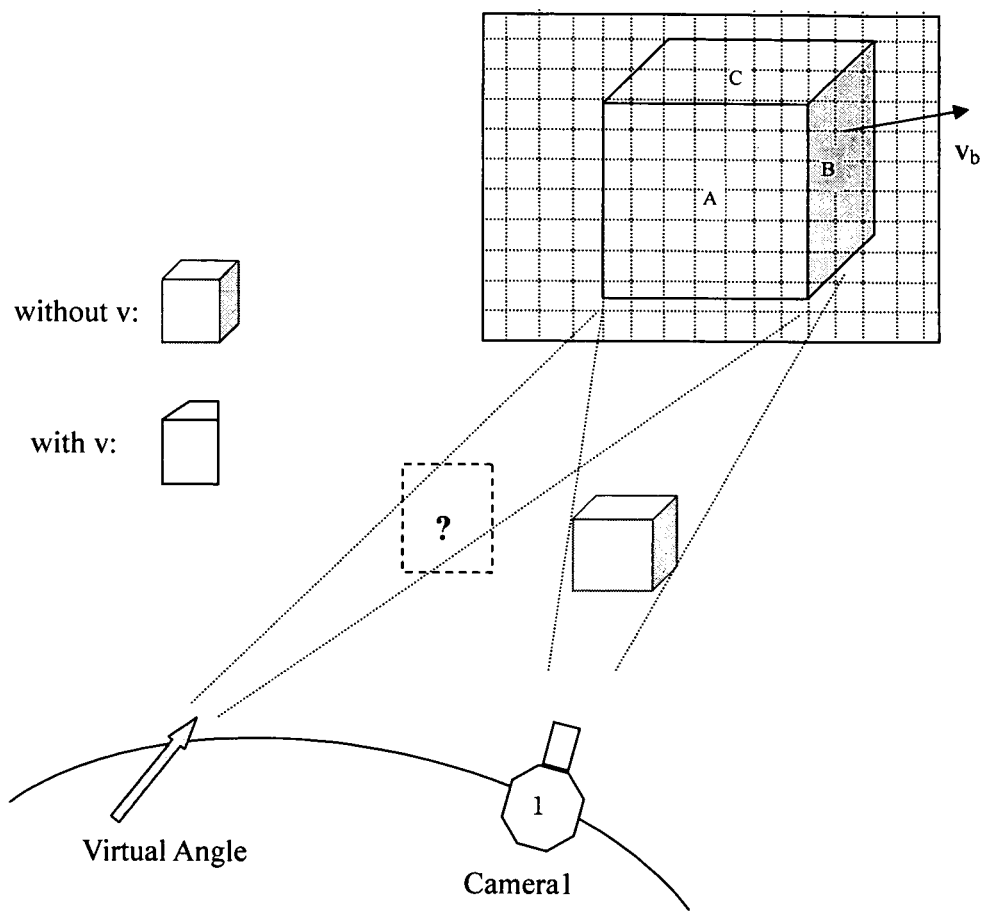
FIG. 8 illustrates a difference between an image segment with normal vector considered and an image segment without normal vector.

When applying shape change in step 64, the focal point is the location or position of the virtual angle or virtual camera. And each of the selected image segment group is projected to the 3D space. Since the coordinates of all the corners of the projected image have been determined, the projected image from the image segment group is applied with a shape change to the image in order to fit the image within the determined coordinates, such as by shrinking, stretching, deleting and tilting. The result is a virtual image of the original image viewed as if a real camera has captured from that location and angle. This is shown in FIG. 8. From the virtual angle, each image segment group in the interpolated image has an associated "projected image" that's in the 3D space. Then, we can apply the reverse process of projection and using the same formula (but in reverse) to find the (x',y',z') of each of the corners of the image segment onto the CCD plane of the virtual camera. This allows us to find the amount of change that is required to the image segment group in the interpolated image in order to best represent the new perspective from that viewing angle.

One should recognize that when projecting an original image segment group (ISG) into 3D space, straight lines is formed from a focal point to each of the corners of the ISG (2D plane) and is projected into 3D space along the same lines, as also shown in FIG. 10. On the other hand, when determining the amount of shape change applied to an ISG, which is step 64 in FIG. 6, straight lines are formed from the focal point of the virtual camera to each corners of the projected image for that ISG. Then, the intersecting point of the lines to the virtual 2D plane provides the shape of the ISG as it appears to the virtual camera perspective. And therefore, the step of determining the amount of shape change applied to an ISG is the reverse process of projecting an original ISG.

Figure 11:
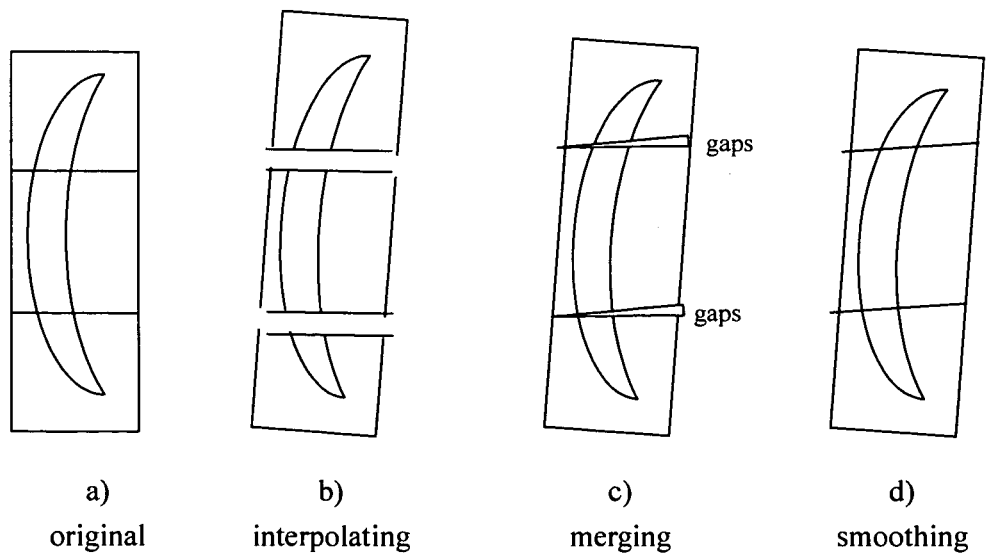
FIG. 11a is an original image divided into image segment groups.
FIG. 11b is interpolated image segments from the original image after the shape change.
FIG. 11c is merged image of interpolated image segments.
FIG. 11d is smoothed merged images.

In step 65, all interpolated images are merged together by placing the modified image segment groups adjacent to each other in the same order as they were oriented in the original image. As illustrated in FIG. 11, the original image divided into segments (a) is interpolated to provide the original image viewed from a different perspective with slight rotation of the image (b). As shown, image (b) has three image segments or image segment groups with appropriate shape modifications based on their projected image, which are now merged together to create the interpolated image (c). The merged image has gaps or overlaps in between the image segments since each image segment projection is not an exact but an approximate representation of the original scene. After applying smoothing function by averaging the amount of the modification factors in each of the image segment groups as discussed later, the gaps and overlaps are removed to provide a presentable interpolated image.

There are two situations of applying smoothing function, step 66. In the first case of overlap between two merged image segments, the merged image segment that is closer in distance to the focal point gets higher priority and shrink the image segment that is located farther by the same amount. In the second case of gap between two merged image segments, the gap is filled with the merged image segment closer in distance to the focal point by stretching or extending it.

Finally, the output of the flowchart in FIG. 6 is in the form of Intimage$\theta_h\theta_v$(t), wherein Intimage is the interpolated image, t is the timestamp, $\theta_h$ is the horizontal viewing angle of virtual camera, and $\theta_v$ is the vertical viewing angle of virtual camera and each of the viewing angles are between 0 and 360 degrees.

The steps in FIG. 6 are repeated for all image segment groups required to deliver the interpolated images to a user. Again, the flowchart in FIG. 6 is repeated for each image segment groups from appropriate cameras in order to provide a user with interpolated images from a virtual angle.

Furthermore, one method of delivering interpolated images to a user is to provide a spherical viewing surface (such as a theater where the screen wraps around a viewer-like planetarium). In that case, the entire 360 degree scene is interpolated with all the different angles and project the images on the screen. The entire 360 degree scene is interpolated and not just one viewing angle. Secondly, the viewer can use a portable display device, such as a phone with display, a laptop, or any type of electrical device with a display that can show the 3D image. Based on the location the device usually based on built-in gyroscope and accelerometer, interpolated images are delivered to the device based on the position of the device based on theta(h) and theta(v).

The output of FIG. 6 may be delivered through a wired or wireless medium, wherein the receiving device is an electrical device capable of receiving electrical signals and converting the signals to a display for viewing. The flowchart described above is controlled by controller 32 operating along with Post-processor 34 and memory 33 in order to interpolate the images retrieved from the memory. The controller and the post-processor may be optionally performed by a single processor or by software controlled by a microprocessor, controller or CPU executing the steps of FIG. 6.

Furthermore, the flowchart in FIG. 6 is repeated to provide a user with 3D images, such as the images retrieved from camera A 35 and camera B 37 in FIG. 3, to provide images for the left and right eyes of the user. When these are sequenced in the right order based on the time stamp, a 3D video stream will result.

The embodiments of the invention have been presented for purpose of description and illustration and are not intended to be exhaustive or to limit the invention to the forms disclosed. Changes and modifications to the specifically described embodiments may be carried out without departing from the principles of the present invention. The scope of the invention is defined by the appended claims, not the preceding disclosure.

What is claimed is:

1. A method of providing interpolated images to an electronic device based on a virtual angle, the method comprising the steps of:
    capturing at least one original image from each of a plurality of cameras in a camera rig;
    dividing the image into a plurality of image segments;

grouping the image segments to provide a plurality of image segment groups (ISGs) based on distance information and normal vector information of the image segments, wherein the normal vector information is a vector perpendicular to a best fitting plane of an image segment;

storing the plurality of ISGs into a memory device, wherein each of the ISGs is stored with camera information, timestamp, the distance information and the normal vector information;

retrieving a first ISG from the memory device, wherein the first ISG is retrieved from the memory device based on the virtual angle;

projecting the first ISG into three-dimensional space;

selecting and discarding sections of the first ISG to provide a selected ISG, wherein the selected ISG is selected based on the position of the virtual angle in relation to neighboring cameras;

interpolating by applying an amount of shape change to the selected ISG to provide an interpolated ISG, wherein said amount of shape change is determined by a reverse process of projecting an original ISG;

repeating the steps of retrieving, projecting, selecting and interpolating until all ISGs relevant to the virtual angle have been processed;

merging the interpolated ISGs to provide a merged ISG;

applying smoothing to the merged ISG to provide an output signal; and transmitting the output signal to the electronic device.

2. A method of providing interpolated images to an electronic device based on a virtual angle, the method comprising:

retrieving a first image segment group (ISG) from a plurality of ISGs stored at a memory device based on the virtual angle;

projecting the first ISG into three-dimensional space;

selecting and discarding sections of the first ISG to provide a selected ISG, wherein the selected ISG is selected based on a position of the virtual angle in relation to neighboring cameras; and interpolating by applying an amount of shape change to the selected ISG to provide an interpolated ISG, wherein said amount of shape change is determined by a reverse process of projecting an original ISG.

3. The method of claim 2 further comprising repeating the steps of retrieving, projecting, selecting and interpolating until all ISGs relevant to the virtual angle have been processed.

4. The method of claim 2 further comprising repeating the steps of retrieving, projecting, selecting and interpolating until all ISGs relevant to the virtual angle have been processed; merging the interpolated ISGs to provide a merged ISG; applying smoothing to the merged ISG to provide an output signal; and transmitting the output signal to the electronic device.

5. The method of claim 2, wherein said projecting the first ISG into three-dimensional space is based on a distance between a focal point and the first ISG (z), distance between one of the four corners of the first ISG and one of the four corners of a projected image(d), normal vector (v), coordinates of a focal point f ($x_f$, $y_f$, $z_f$), coordinates of the first ISG (x', y', z'), and coordinates of a projected image (x, y, z).

6. The method of claim 2, wherein said selected ISG is based on the position of the virtual angle in relation to its neighboring cameras by:

Image(i)=(d1/(d2+d1))(image2)+(d2/(d2+d1))(image1), wherein image(i) is an image viewed at the virtual angle, d1 is distance between the virtual angle and camera1, d2 is distance between the virtual angle and camera2, image1 is image captured by camera1, and image2 is image captured by camera2.

7. The method of claim 2, wherein coordinates of each corners of a projected image are calculated by:

$$C = B + \frac{((B-f)*d)}{z}$$

wherein f is coordinates of a focal point, B is coordinate of one of the corners of image segment group, C is coordinate of one of the corners of projected image, d is distance between B and C, and z is distance between f and B.

8. The method of claim 2 further comprising a step of transmitting an output signal to the electronic device as Intimage$\theta_h\theta_v$(t), wherein Intimage is an interpolated image, t is timestamp, $\theta_h$ is horizontal viewing angle of virtual camera, and $\theta_v$ is vertical viewing angle of virtual camera, and each of the viewing angles are between 0 and 360 degrees.

9. The method of claim 2 further comprising a step of applying smoothing to a merged ISG, wherein said applying smoothing to the merged ISG includes at least one of shrinking, stretching, deleting and tilting.

10. A method of providing interpolated images to an electronic device based on a virtual angle, the method comprising the steps of:

retrieving a first image segment group (ISG) from a plurality of ISGs stored at a memory device based on the virtual angle, wherein the plurality of ISGs are formed by dividing and grouping images captured by plurality of cameras in a camera rig;

projecting the first ISG into three-dimensional space; and interpolating by applying an amount of shape change to the first ISG to provide an interpolated ISG, wherein said amount of shape change is determined by a reversed process of projecting an original ISG.

11. The method of claim 10 further comprising repeating the steps of retrieving, projecting and interpolating until all ISGs relevant to the virtual angle have been processed.

12. The method of claim 10 further comprising repeating the steps of retrieving, projecting and interpolating until all ISGs relevant to the virtual angle have been processed; merging the interpolated ISGs to provide a merged ISG; applying smoothing to the merged ISG to provide an output signal; and transmitting the output signal to the electronic device.

13. The method of claim 10, wherein said projecting the first ISG into three-dimensional space is based on a distance between a focal point and the first ISG (z), distance between one of the four corners of the first ISG and one of the four corners of a projected image(d), normal vector (v), coordinates of a focal point f ($x_f$, $y_f$, $z_f$), coordinates of the first ISG (x', y', z'), and coordinates of a projected image (x, y, z).

14. The method of claim 10, wherein coordinates of each corners of a projected image are calculated by:

$$C = B + \frac{((B-f)*d)}{z}$$

wherein f is coordinates of a focal point, B is coordinate of one of the corners of image segment group, C is coordinate of one of the corners of projected image, d is distance between B and C, and z is distance between f and B.

15. The method of claim 10 further comprising a step of transmitting an output signal to the electronic device as Intimage$\theta_h\theta_v$(t), wherein Intimage is an interpolated image, t is timestamp, $\theta_h$ is horizontal viewing angle of virtual camera, and $\theta_v$ is vertical viewing angle of virtual camera, and each of the viewing angles are between 0 and 360 degrees.

16. The method of claim 10 further comprising a step of applying smoothing to a merged ISG, wherein said applying smoothing to the merged ISG includes at least one of shrinking, stretching, deleting and tilting.

17. The method of claim 1, wherein the output signal transmitted to the electronic device is Intimage$\theta_h\theta_v$(t), wherein Intimage is an interpolated image, t is timestamp, $\theta_h$ is horizontal viewing angle of virtual camera, and $\theta_v$ is vertical viewing angle of virtual camera, and each of the viewing angles are between 0 and 360 degrees.

18. The method of claim 1, wherein said selected ISG is based on the position of the virtual angle in relation to its neighboring cameras by:

Image($i$)=($d1$/($d2$+$d1$))(image2)+($d2$/($d2$+$d1$))(image1), wherein image(i) is an image viewed at the virtual angle, d1 is distance between the virtual angle and camera1, d2 is distance between the virtual angle and camera2, image1 is image captured by camera1, and image2 is image captured by camera2.

19. The method of claim 1, wherein coordinates of each corners of a projected image are calculated by:

$$C = B + \frac{((B-f)*d)}{z}$$

wherein f is coordinates of a focal point, B is coordinate of one of the corners of image segment group, C is coordinate of one of the corners of projected image, d is distance between B and C, and z is distance between f and B.

20. The method of claim 1, wherein said projecting the first ISG into three-dimensional space is based on a distance between a focal point and the first ISG (z), distance between one of the four corners of the first ISG and one of the four corners of a projected image(d), normal vector (v), coordinates of a focal point f ($x_f$, $y_f$, $z_f$), coordinates of the first ISG (x', y', z'), and coordinates of a projected image (x, y, z).

* * * * *